Patented Aug. 30, 1949

2,480,268

UNITED STATES PATENT OFFICE 2,480,268

MANUFACTURE OF BICYCLOALKYL AROMATIC COMPOUNDS AND HYDROCARBONS

Vladimir N. Ipatieff and Herman Pines, Chicago, Ill., assignors to Universal Oil Products Company, Chicago, Ill., a corporation of Delaware No Drawing. Application March 29, 1947, Serial No. 738,208

6 Claims. (Cl. 260—668)

This invention relates to a process for manufacturing bicyclic alkyl aromatic compounds and particularly bicycloalkyl aromatic hydrocarbons.

An object of this invention is to produce bicycloalkyl aromatic compounds.

Another object of this invention is to produce a bicycloalkyl benzene hydrocarbon.

One specific embodiment of this invention relates to a process for producing bicycloalkyl aromatic compounds which comprises reacting an aromatic compound having a replaceable nuclear hydrogen atom and a bicycloalkene in the presence of an alkylating catalyst at an alkylating temperature.

Another embodiment of this invention relates to a process for producing bicycloalkyl aromatic compounds which comprises reacting an aromatic compound having at least one replaceable nuclear hydrogen atom and a bicycloalkene in the presence of an acid-acting alkylating catalyst at an alkylating temperature.

A further embodiment of this invention relates to a process for producing a bicycloalkyl benzene hydrocarbon which comprises reacting at alkylating conditions in the presence of an acid-acting alkylating catalyst a benzene hydrocarbon having a replaceable nuclear hydrogen atom and a bicycloalkene containing a ring of six carbon atoms and a ring of five carbon atoms.

Aromatic compounds usable as starting materials in this process have at least one replaceable nuclear hydrogen atom and also have a carbon atom of said ring combined with a member of the group consisting of a hydrogen atom, a halogen atom, a hydroxyl group, an amino group, an alkoxyl group, an alkyl group, a cycloalkyl group and an aryl group. Aromatic hydrocarbon starting materials include particularly benzene, monoalkyl benzenes, other alkyl benzenes, having at least one replaceable nuclear hydrogen atom and also poly nuclear aromatic hydrocarbons containing replaceable nuclear hydrogen atoms. The other aromatic compounds which are convertible by this process into bicycloalkyl aromatic compounds include particularly halo benzenes, phenols, naphthols, anilines, alkyl aryl ethers, and the like.

Bicycloalkene hydrocarbons and particularly bicycloalkene hydrocarbons having a ring of six carbon atoms and a ring of five carbon atoms may be obtained from natural sources or be produced synthetically or by isomerization of certain terpenic hydrocarbons. Bicyclo-olefins containing a ring of six carbon atoms and a second ring of five carbon atoms include camphene, bornylene, 2,6-dimethyl-bicyclo-(3,2,1)-2-octene, etc.

Acid-acting catalysts which are suitable for promoting the process of this invention include sulfuric acid, hydrogen fluoride, phosphoric acid, metal halides of the Friedel-Crafts type, boron trifluoride, activated clays, and synthetic composites of silica with at least one member of the group consisting of alumina, magnesia, thoria, titania, and zirconia.

This process may be carried out using either batch or continuous types of treatment. In batch-type operation, an aromatic compound and a bicyclo-olefin are reacted in the presence of one or more of the above indicated acid-acting catalysts in a closed vessel provided with adequate means of agitation and maintained at a temperature at which the aromatic compound is alkylated by or condensed with the bicyclic olefin. The resultant reaction mixture is then subjected to suitable separating treatment to recover the unreacted hydrocarbons which are suitable for further treatment in the process and to isolate the desired bicycloalkyl aromatic compound formed in the process.

Continuous operation may be carried out by charging the aromatic compound and bicyclic olefin to a reactor containing an acid-acting catalyst distributed upon or composited with a supporting material and provided with suitable heating or cooling means for controlling the reaction temperature. When operating with an acid-acting catalyst which is in liquid or gaseous state at the reaction conditions, the catalyst may be charged continuously to the reactor to which the reacting organic compounds are charged. From the exit of the reactor or series of reactors in case more than one is so employed, the total reaction mixture is directed to suitable separating and/or fractionally distilling means by which the bicycloalkyl aromatic compound or bicycloalkyl aromatic hydrocarbon formed in the process may be separated from unconverted starting materials and catalyst, these unconverted materials and catalysts being suitable for recycling to the process.

The operating conditions used in the batch-type and continuous type of operation generally depend upon the chemical activity of the reactants and the catalytic activity of the acid-acting catalyst. In general, a temperature of from about $-10°$ to about $50°$ C. is used with a catalyst such as sulfuric acid, while a higher temperature of from about $75°$ to about $300°$ C. is used in the presence of a phosphoric acid catalyst, such as a normally liquid phosphoric acid, a phosphoric acid supported by a carrier, or a solid precalcined composite of a siliceous carrier and a phosphoric acid, such as ortho phosphoric acid or a poly phosphoric acid including pyrophosphoric acid, triphosphoric acid, and tetraphosphoric acid.

When aluminum bromide or aluminum chloride is utilized as a condensation catalyst in this process, the operating temperature is generally below about 40° C. while somewhat higher temperatures are needed in the presence of ferric chloride which is a Friedel-Crafts catalyst of lower activity than aluminum chloride.

The following example is given to illustrate the process of this invention although the data are introduced with no intention of limiting unduly the generally broad scope of the invention.

One part by volume (30 ml.) of sulfuric acid of 96% concentration and one part by volume of benzene were placed in a glass reactor cooled to 4° C. To the cooled mixture of benzene and sulfuric acid was added a solution of one part by volume of benzene and one part by volume of 2,6-dimethyl-bicyclo-(3,2,1)-2-octene. The mixture of benzene and the bicyclic olefin was added with stirring during a time of one hour and the resultant reaction mixture was then stirred for an additional time of 0.5 hour. The resultant reaction mixture upon standing separated into an upper hydrocarbon layer and a lower sulfuric acid layer which was withdrawn and discarded. The hydrocarbon layer was then washed with caustic soda solution, and with water, and then dried and distilled. Based upon the amount of 2,6-dimethyl-bicyclo-(3,2,1)-octane charged, a 70% yield of alkylation product was obtained boiling between 160° and 170° C. at a pressure of 27 mm. of mercury and having a refractive index, $n_D^{20}$, of 1.5270 and a specific gravity, $d_4^{20}$, of 0.9555. An analysis of the alkylation product showed it to contain 89.45 per cent by weight of carbon and 10.36 per cent by weight of hydrogen. These analytical results correspond closely to the theoretical analysis calculated for the hydrocarbon $C_{16}H_{22}$ which contains 89.65% carbon and 10.35% hydrogen. This alkylation product consisted essentially of 2-phenyl-2,6-dimethyl-bicyclo-(3,2,1)-octane.

We claim as our invention:

1. A process for producing bicycloalkyl aromatic compounds which comprises reacting an aromatic compound having at least one replaceable nuclear hydrogen atom and a bicycloalkene containing a ring of six carbon atoms and a ring of five carbon atoms in the presence of an acid-acting alkylating catalyst at an alkylating temperature.

2. A process for producing a bicycloalkylbenzene hydrocarbon which comprises reacting at alkylating conditions in the presence of an acid-acting alkylating catalyst a benzene hydrocarbon having a replaceable nuclear hydrogen atom and a bicycloalkene containing a ring of six carbon atoms and a ring of five carbon atoms.

3. A process for producing a bicycloalkylbenzene hydrocarbon which comprises reacting a benzene hydrocarbon having a replaceable nuclear hydrogen atom and a bicycloalkene containing a ring of six carbon atoms and a ring of five carbon atoms in the presence of a sulfuric acid alkylating catalyst.

4. A process for producing a bicycloalkylbenzene hydrocarbon which comprises reacting a benzene hydrocarbon having a replaceable nuclear hydrogen atom and a bicycloalkene containing a ring of six carbon atoms and a ring of five carbon atoms in the presence of a phosphoric acid alkylating catalyst.

5. A process for producing a bicycloalkylbenzene hydrocarbon which comprises reacting a benzene hydrocarbon having a replaceable nuclear hydrogen atom and a bicycloalkene containing a ring of six carbon atoms and a ring of five carbon atoms in the presence of a hydrogen fluoride alkylating catalyst.

6. A process for producing 2-phenyl-2,6-dimethylbicyclo-(3,2,1)-octane which comprises reacting benzene and 2,6-dimethyl-bicyclo-(3,2,1)-2-octene in the presence of sulfuric acid at a temperature of from about −10° to about 50° C.

VLADIMIR N. IPATIEFF.
HERMAN PINES.

REFERENCES CITED

The following references are of record in the file of this patent:

UNITED STATES PATENTS

| Number | Name | Date |
|---|---|---|
| 1,939,932 | Thomas | Dec. 19, 1933 |
| 2,246,762 | Schirm | June 24, 1941 |